FIG. 2

Patented Sept. 25, 1923.

1,469,083

UNITED STATES PATENT OFFICE.

HENRY O'B. HARDING AND JAMES JESSEN, OF MINNEAPOLIS, MINNESOTA; SAID JESSEN ASSIGNOR TO SAID HARDING.

SACK-CLOSING MACHINE.

Application filed May 11, 1922. Serial No. 560,044.

*To all whom it may concern:*

Be it known that we, HENRY O'B. HARDING and JAMES JESSEN, citizens of the United States, residing at Minneapolis, in the county of Hennepin and State of Minnesota, have invented certain new and useful Improvements in Sack-Closing Machines, of which the following is a specification.

Our invention relates to sack closing machines, and the general object is to provide mechanism for automatically preparing and carrying or feeding filled paper or other sacks to a position in a tying machine where the prepared mouth of the sack is readily compacted, by other suitable mechanism into a uniform neck of small compass for receiving loops of cord laid about the same by suitable tying mechanism, such as that disclosed in Patent No. 1,196,459, issued August 29th, 1916. We accomplish the objects of our invention by providing mechanism for moving the open-mouthed sack by suitable carrying means to a position for the elongation of the rounded mouth of the sack, preliminary to feeding the sack between crimping rolls to the place of compacting and tying the neck of the sack. The sacks are placed either by suitable conveying means from a weighing machine or scale or by hand, upon a yieldingly supported plate upon which a filled sack is placed and which, when depressed by the weight of the sack, puts in motion a conveyor which carries the sack along and stops it underneath a top-flattening device consisting of two vertical fingers which are lowered into the mouth of the sack and then separated from each other to extend the sack mouth to the limit permitted by the material so as to bring the top edges of the sack into two parallel lines lying close to each other and extending in the direction of travel of the sack. Before the fingers are withdrawn from the mouth of the sack, wing members are moved from each side upon the flattened or elongated mouth of the sack and the conveyor is then automatically started carrying the elongated mouth of the sack away from the wing members and between fixed guides to the crimping rollers adjacent the tying mechanism. In order that the machine may be successfully used in connection with different sized sacks, means is provided for varying the extent to which the vertical fingers are separated from each other after lowered into the sack mouth, and means is also provided for varying the position in which the sack conveyor is stopped in order that the vertical fingers may be lowered directly into the center of the sack mouth before they are moved away from each other to extend and flatten the mouth of the sack.

The full objects and advantages of our invention will appear in connection with the detailed description, and the novel features embodied in our inventive idea will be particularly pointed out in the claims.

In the drawings which illustrate one embodiment of our invention.

Figure 1:
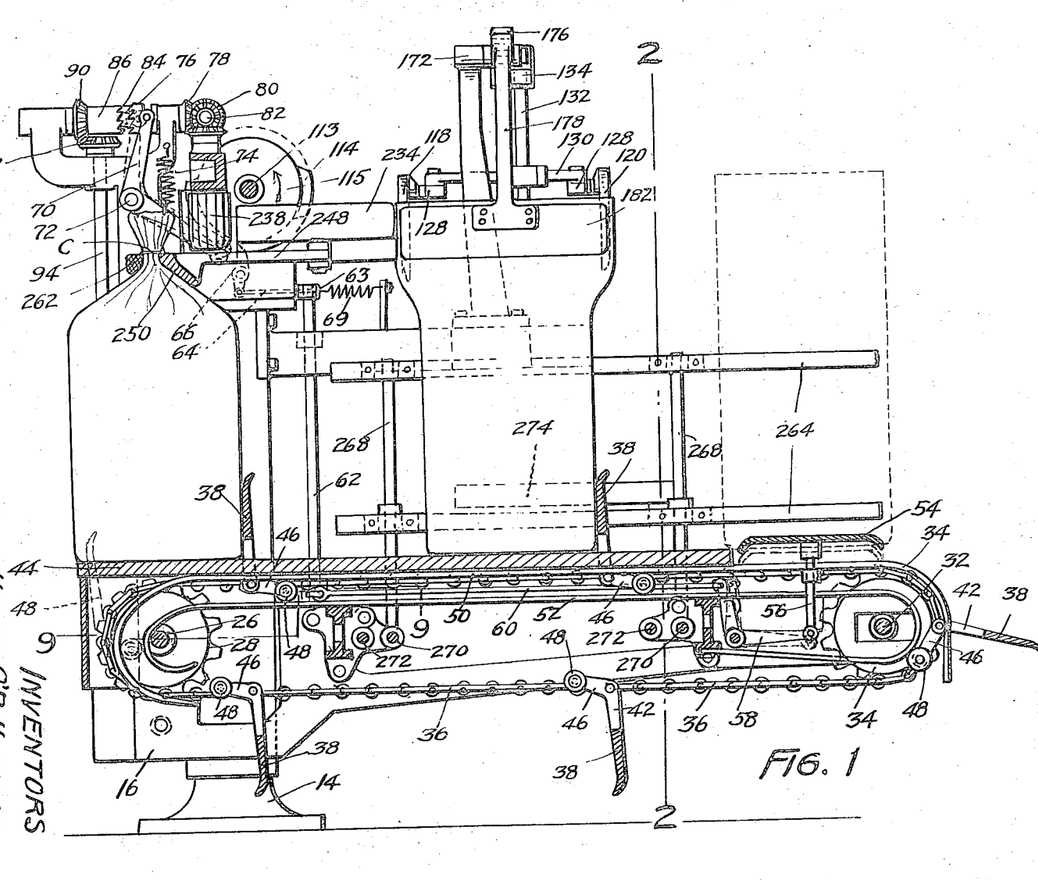
Fig. 1 is a sectional side elevational view of a machine showing sacks in the act of being prepared and tied.
Figure 2:
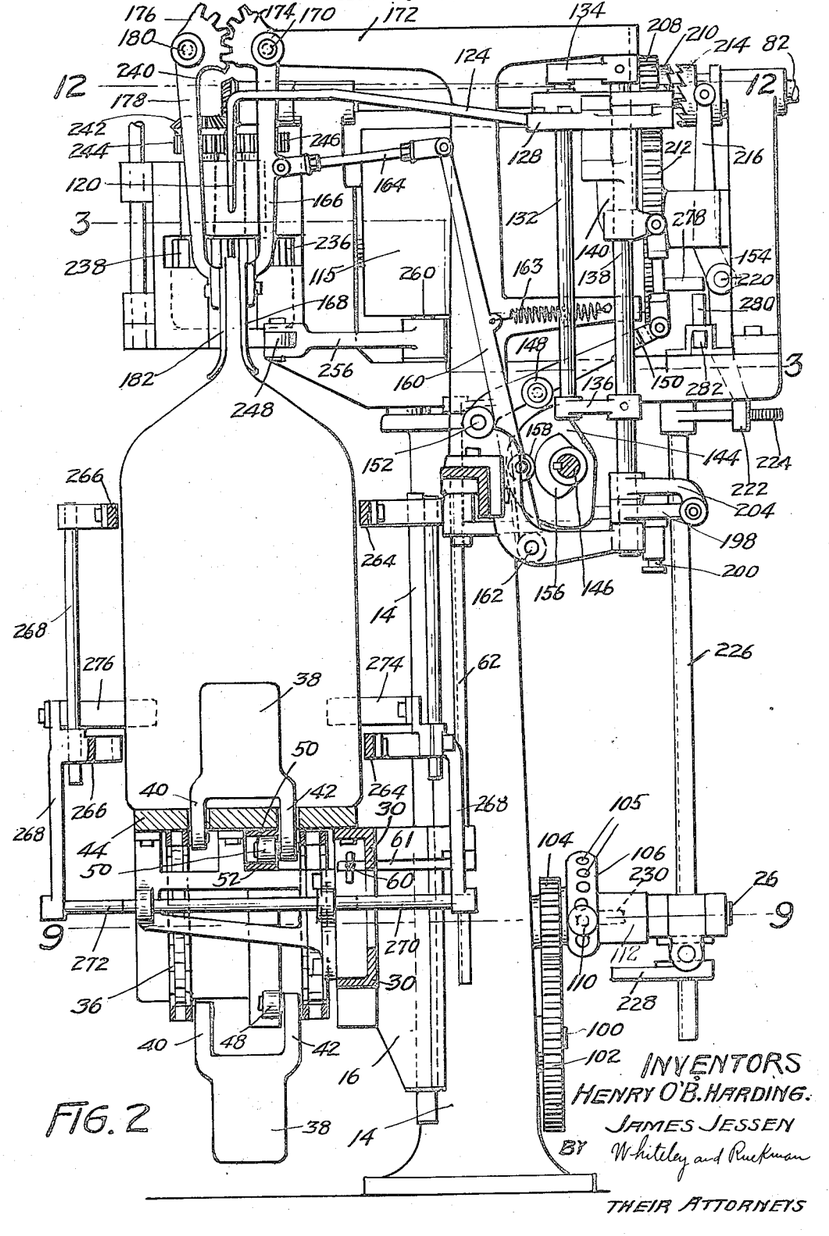
Fig. 2 is a vertical section on the line 2—2 of Fig. 1 showing the preparing mechanism and sack as it is prepared for the feeding operation.
Figures 3, 4, 5:
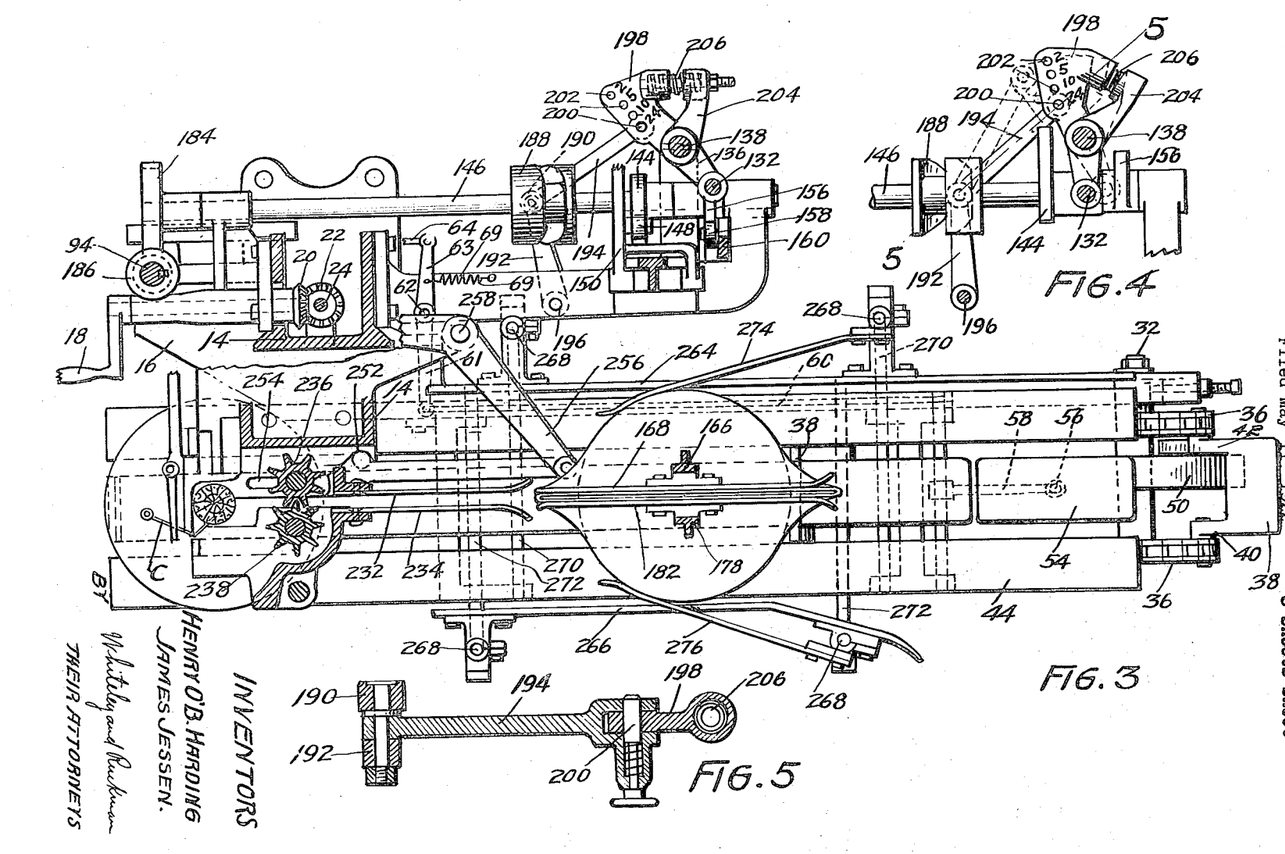
Fig. 3 is a horizontal section on the line 3—3 of Fig. 2 with the frame of the machine broken away in parts.
Fig. 4 is a detail view of a portion of Fig. 3 showing the actuating parts of the preparing mechanism in a different or advanced position.
Fig. 5 is a view in section on the line 5—5 of Fig. 4.

As illustrated, the machine is supported upon standards 14 to which is slidably attached a support 16 vertically adjusted in suitable manner as by the means shown in Fig. 3 consisting of a hand crank 18 secured to one end of a horizontal shaft to the other end of which is secured a bevel gear 20 meshing with a bevel gear 22 secured to a vertical shaft 24 so that upon turning the hand crank 18 the support 16 may be moved up or down to accommodate the machine to sacks of different height. Rotatably mounted in the support 16 is a shaft 26 (Fig. 9) to which are secured two sprocket wheels 28. The support 16 has a rearward extension 30 carrying a stationary shaft 32 upon which two sprocket wheels 34 are rotatably mounted, the sprocket chains 36 being placed around these two pairs of sprocket wheels. Pivotally attached to the chains 36 are a plurality of outstanding arms 38 arranged at regular intervals. The arms 38 at their inner ends are intermediately cut away so as to provide two fingers 40 and 42 which are adapted to extend through longitudinal slots in a platform 44 as shown in Fig. 2. This platform is mounted on the support 16 and is positioned just above the upper stretch of the chains 36. As will be apparent from Figs. 1 and 2, the fingers 42 are extended to form crank members 46 beyond the pivotal attachment to the chains and the outer ends of the crank members are provided with rollers 48 which travel between an upper track 50 and a lower track 52. At the delivery end of the machine the tracks are downwardly and inwardly curved as shown in Fig. 1 so that the arms 38 are caused to descend vertically as indicated in dotted lines instead of being directed outwardly at this time. This prevents the tied sack from being forcibly thrown off the platform. The middle portion of the platform 44 at its rear end does not extend as far as the position of the sprocket wheel 34 but adjacent this rear end is a plate 54 upon which the filled sacks which are to be prepared for tying are placed. The plate 54 is secured to the upper end of a slidable rod 56, the lower end of which is attached to a crank arm 58 which is joined by a connecting rod 60 to a crank 61 splined on the lower portion of a vertical rock shaft 62. Attached to a crank 63 on the upper end of the rock shaft 62 is a connecting rod 64 which at its forward end is attached to the lower end of a pivoted latch member 66 which is normally held by a spring 68 in the position shown in Figs. 6 and 11.

Figures 6, 7, 8, 14, 15:
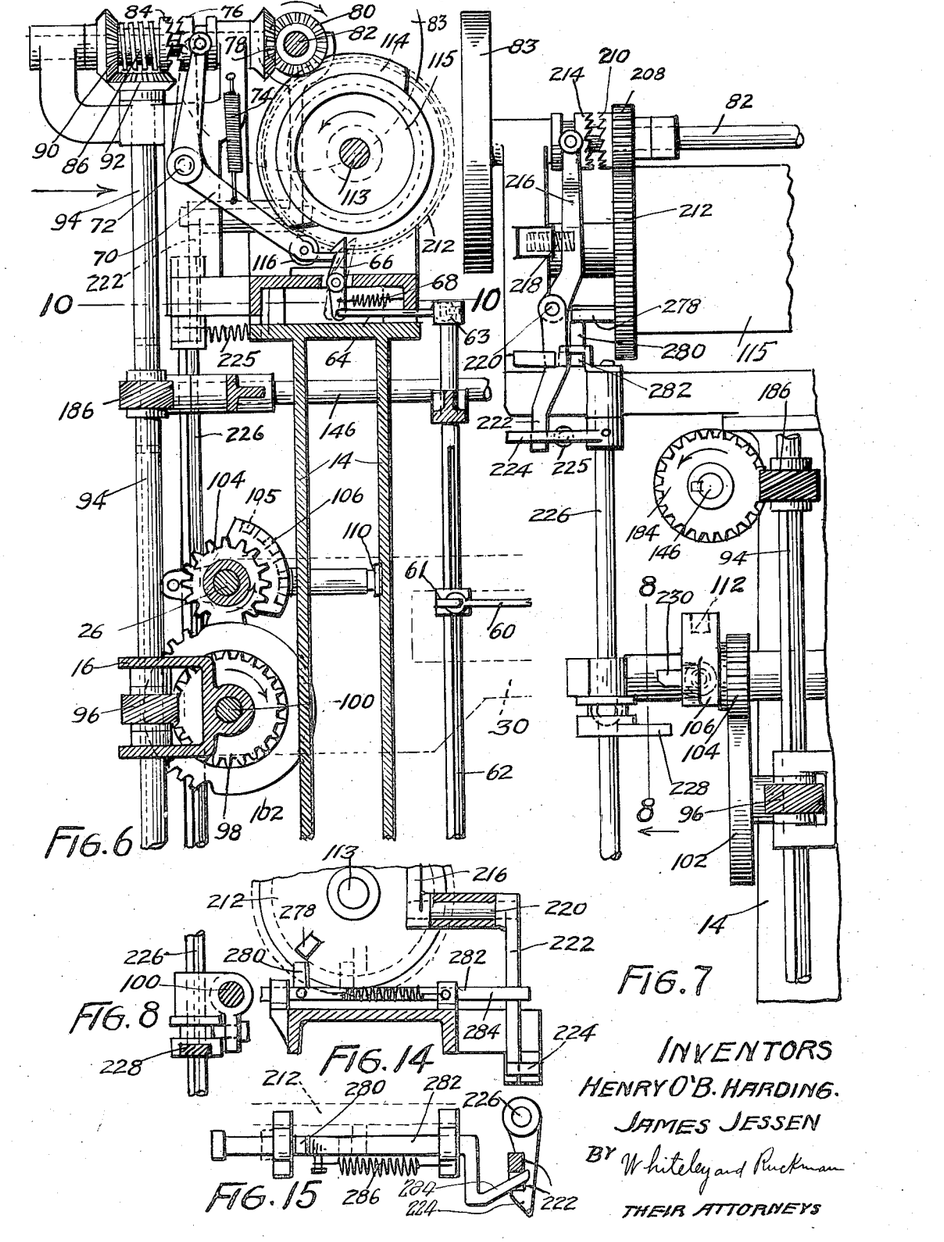
Fig. 6 is a view in vertical section of a portion of the machine illustrating the mechanism for the periodical starting and stopping of the machine and showing the parts in position when at rest.
Fig. 7 is a side view of Fig. 6 looking in the direction of the arrow.
Fig. 8 is a detail view taken on the line 8—8 of Fig. 7.
Figs. 14 and 15 are detail views of a clutch disengaging device.
Figures 9, 10, 11:
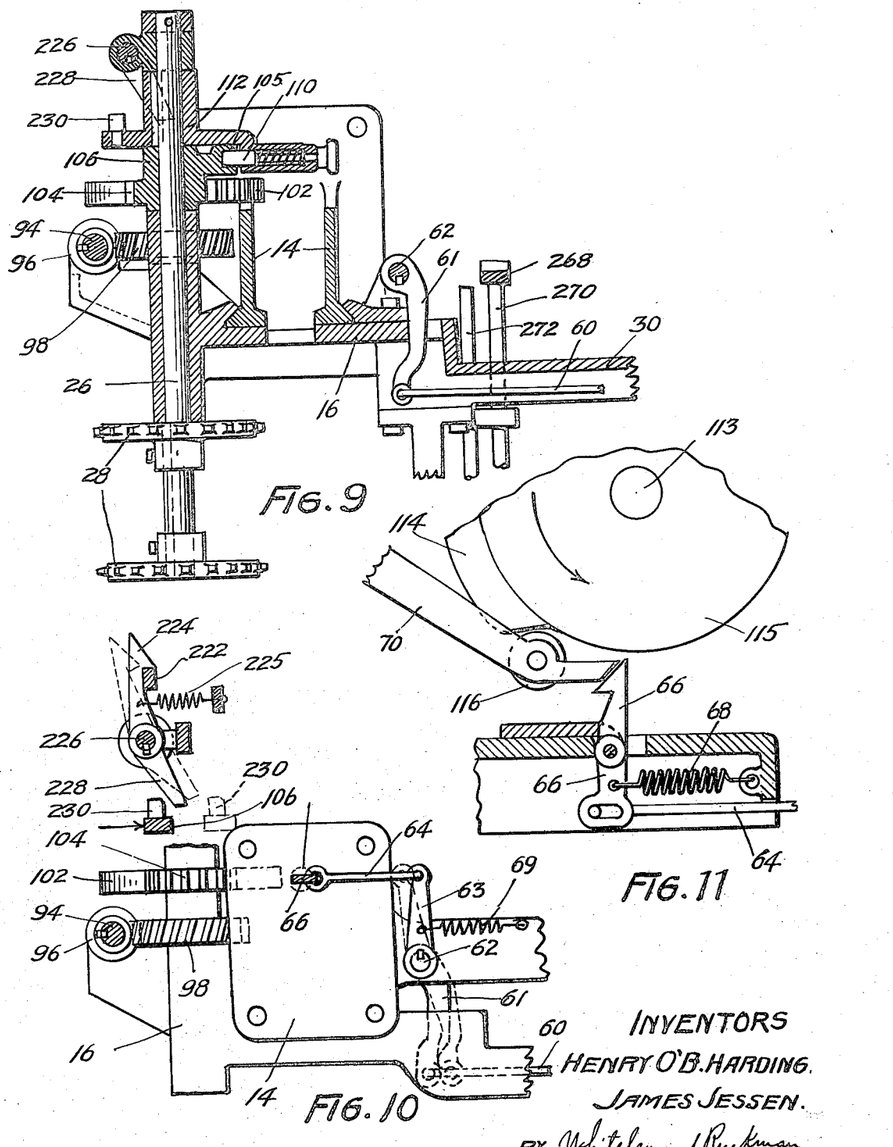
Fig. 9 is a view in horizontal section on the lines 9—9 of Figs. 1 and 2.
Fig. 10 is a view in horizontal section on the line 10—10 of Fig. 6.
Fig. 11 is a detail view of parts shown in Fig. 6 and showing parts of the starting and stopping mechanism in different position.
Figure 12:
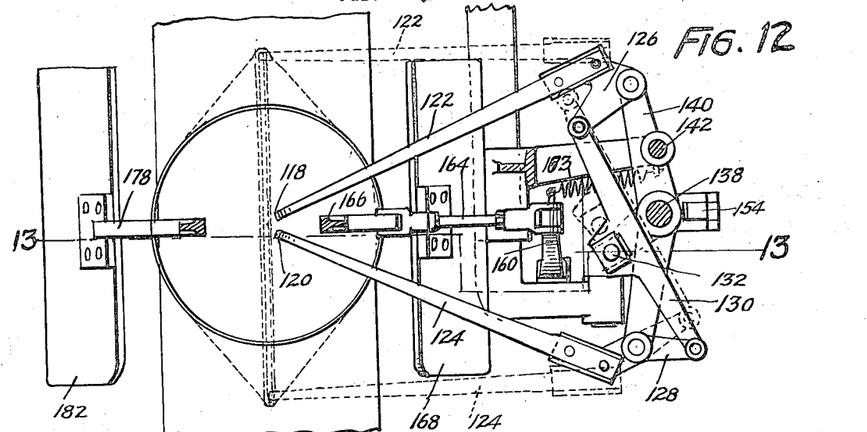
Fig. 12 is a sectional plan view of the upper parts of the preparing mechanism, this section being taken on the line 12—12 of Fig. 2.
Figure 13:
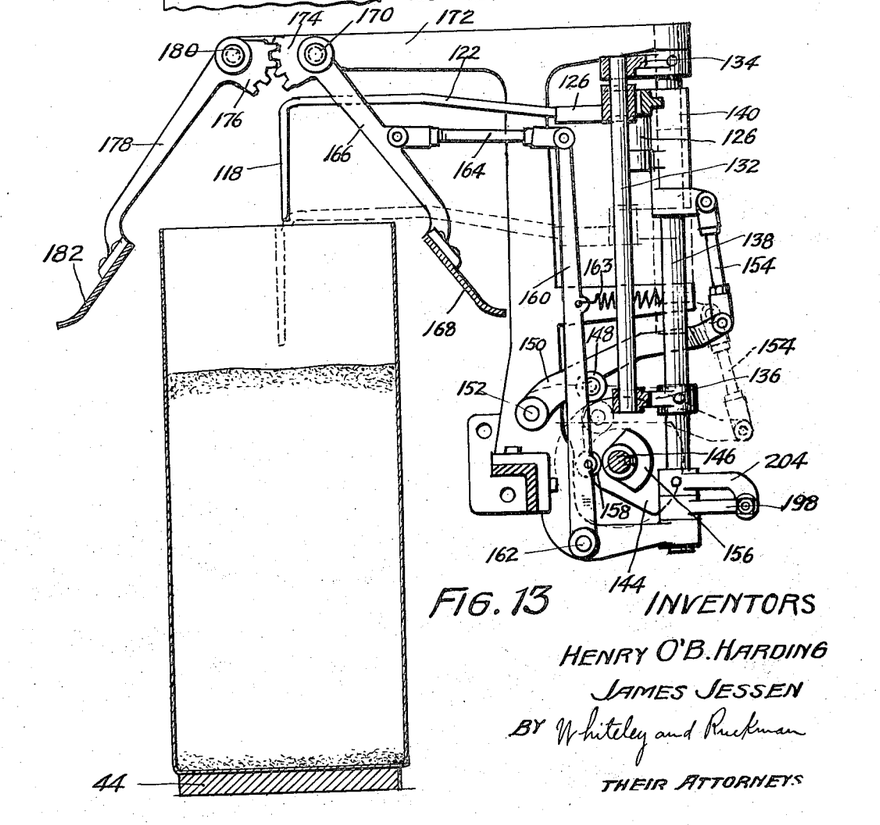
Fig. 13 is a view in vertical section on the line 13—13 of Fig. 12 illustrating by dotted lines the operation of the sack preparing mechanism.

A spring 69 tends to turn the rock shaft 62 in such manner that the plate 54 will normally be held upwardly in the full line position shown in Fig. 1. When a filled sack is placed on the plate 54, its weight depresses this plate and the rock shaft 62 is caused to turn and through the connecting rod 64 push the latch member 66 into the dotted line position shown in Fig. 6. The latch shoulder on this latch member thereby releases a lever 70 which is pivoted at 72 and a spring 74 then causes the upper end of the lever 70 to move toward the left as viewed in Fig. 6. This lever end is forked so as to extend into a circular recess in a clutch member 76 splined on a shaft to which is secured a bevel gear 78 meshing with a bevel gear 80 secured to a driving shaft 82 provided with a driving pulley 83. A cooperating clutch member 84 is secured to a sleeve 86. Secured to the sleeve 86 is a bevel gear 90 which meshes with a bevel gear 92 secured to the upper end of a shaft 94. To this shaft is splined a spiral gear 96 which meshes with a spiral gear 98 secured to a shaft 100 to the outer end of which is secured a mutilated spur gear 102 as best shown in Figs. 2 and 6. This gear is adapted to mesh with a spur gear 104 having a concave portion adapted to lock with the convex blank portion of the gear 102. The gear 104 has an extended hub 106 loosely mounted on the shaft 26. This hub is provided with a plurality of holes 105 any one of which may be engaged by a spring pressed bolt 110 carried by a flanged sleeve 112 secured to the shaft 26 as shown in Fig. 9. By placing the bolt 110 in different holes, the position at which the arms 38 will stop may be varied. This adjustment, as will appear later, is necessary in order to accommodate the machine to different sized sacks. Secured to a shaft 113 is a cam member 115 having a raised cam portion 114, the extent of which is such that it comes into engagement with a roller 116 mounted on the lever 70 at the time when a sack is in proper preparing position and another sack is in proper tying position. The cam 114 depresses the lever 70, thereby unclutching the clutch members 76 and 84 and, as will be apparent from Fig. 11, the depressed end of this lever will be engaged by the shoulder on the latch member 66 so that the lever will be held in depressed condition until the latch is retracted by the placing of a sack on the receiving plate 54. When the sack has been conveyed into the proper preparing position the mouth thereof is extended by the following mechanism. A pair of depending fingers 118 and 120 are formed on the free ends of arms 122 and 124 the other ends of which are attached to rocker members 126 and 128 which are connected by a link 130 slidable on a vertical rod 132 which is connected to an upper crank 134 and a lower crank 136 carried by a rock shaft 138 which is rocked in a manner which will be described later. The rocker members 126 and 128 are pivoted to opposite ends of a bar 140 which is slidable upon a rod 142 and upon the rock shaft 138. The bar 140 is caused to move up and down by a cam 144 secured to a shaft 146. This cam engages a roller 148 mounted on a lever 150 pivoted at 152 and having its free end connected by a link 154 to the bar 140. It will be understood that the rock shaft 138 is rocked after the depending fingers have been lowered into the mouth of the sack so that this rocking movement will bring the fingers from full line position into the dotted line position shown in Fig. 12. Also secured to the shaft 146 is a cam 156 engaging a roller 158 mounted on a lever 160 pivotally attached at 162. The lever 160 when not operated by the cam 156 is pulled toward the right as viewed in Fig. 2 by a spring 163. The upper end of the lever 160 is connected by a link 164 to a rocker arm 166 which at its lower end carries a wing 168. The arm 166 is pivoted at 170 to a frame member 172 and adjacent its pivot has a segmental gear 174 in mesh with a segmental gear 176 on an arm 178 pivoted at 180. The lower end of the arm 178 carries a wing member 182 which is thus adapted to cooperate with the wing member 168 so that these wing members are operated in unison from opposite sides against the mouth of the sack. For driving the shaft 146 a spiral gear 184 is secured thereto, and this gear meshes with a spiral gear 186 splined on the shaft 94. The rock shaft 138 is rocked from the shaft 146 by a cam 188 which has a cam groove in which travels a roller 190 attached at the junction of toggle links 192 and 194. The outer end of the toggle link 192 is pivoted at 196 to the frame and the outer end of the toggle link 194 is adapted to be adjustably connected to an arm 198 by a spring bolt 200 which may be engaged in any one of a number of holes 202 formed in the arm. These holes as shown in Figs. 3 and 4 correspond to different sized sacks weighing, for instance when filled, two pounds, five pounds, ten pounds, and twenty-four pounds. The extent to which the fingers 118 and 120 will be separated from each other is determined by the particular hole which is engaged by the bolt 200. The arm 198 is enlarged to encircle the rock shaft 138 but instead of being secured thereto is spaced from a lug 204 secured to the rock shaft and a spring 206 is interposed between the arm 198 and the lug 204. This allows a yielding movement of the spring fingers when separated in case some of the sacks should run smaller than the normal size.

Loosely mounted on the driving shaft 82 is a gear 208 to which is attached a clutch member 210. The gear 208 meshes with a gear 212 secured to the shaft 113 which carries the cam member 115. Splined on the driving shaft 82 is a clutch member 214 having a circular groove for cooperation with a shifting arm 216 engaged by a spring 218 which tends to hold the clutch members 210 and 214 engaged. The lower end of the arm 216 is secured to a rock shaft 220 to which is also secured a depending arm 222 adapted to be engaged by a latch arm 224 for holding clutch members 210 and 214 unclutched. The latch arm 224 is normally held in latching position by a spring 225 as shown in Fig. 10, and this arm is secured to the upper part of a rock shaft 226 to which at a lower position thereon is secured an arm 228 adapted to be struck by a projection 230 carried by the member 112 so that the latch member will be moved into unlatching position as shown in dotted lines in Fig. 10; thereby permitting the clutch members to engage. The manner in which the clutch members are disengaged at the proper time will be described later. Ahead of the position occupied by the wing members 168 and 182 when depressed are two fixed guides 232 and 234 for guiding the flattened mouth of the sack when the latter is moved forward while adjacent the forward ends of these guides are two cooperating crimping rollers 236 and 238 which rotate all the time when the driving shaft is running, since they are driven from the driving shaft by a bevel gear 240 secured thereto and meshing with a bevel gear 242 attached to the upper end of the crimping roller 238. Secured to the gear 242 is a spur gear 244 meshing with a spur gear 246 attached to the upper end of the crimping roller 236. After the sack mouth has moved past the crimping rollers, it is necessary that it be compacted at the tying point. This is accomplished by a pusher bar 248 having an engaging head 250. This bar carries a roller 252 operating in a cam slot 254 so that the head 250 will be brought up behind the crimped sack mouth when the pusher bar is moved ahead and when retracted will lie at the side of the path of movement of the sack mouth. For operating the pusher bar, it is attached to an operating crank arm 256 pivoted at 258, the free end of which engages the cam member 115 by means of a roller 260. A fixed abutment 262 is in engagement with the forward end of the sack mouth when the rear end thereof is engaged and compacted by the movable head 250. After the sack mouth has been compacted in this manner, it is tied by a cord C which may be laid and tied by any customary or suitable mechanism. The sack when on the conveyor is supported at the sides thereof by fixed guides 264 and 266 which are supported by vertical rods 268 carried by separate slidable horizontal rods 270 and 272 whereby adjustment for different sized sacks may be made. In order to prevent the momentum of the sack taking it ahead when the conveyor is stopped in preparing position with the sack underneath the depending fingers 118 and 120, flexible strips 274 and 276 are provided which check the movement of the sack as soon as the conveyor is stopped. For disengaging the clutch members 210 and 214 at the proper time, a lug 278 is secured to the face of the gear 212. This lug, during the rotation of the gear 212, engages a projection 280 carried by a slide 282 having an inclined end portion 284 for engaging the arm 222 and pushing it into position to be held by the latch member 224. The clutch members are thus held disengaged in opposition to the tension of the spring 218 until the latch 224 releases the arm 222 in the manner previously described. A spring 286 serves to return the slide 282 to its original position.

The operation and advantages of our invention will be readily understood in connection with the foregoing description. When a filled sack is placed upon the plate 54 this plate is depressed by the weight of the sack. The connections between this plate and the latch 66 cause the latter to be released from the end of the lever 70 so that the spring 74 will cause the clutch member 76 to be slid into engagement with the clutch member 84, thereby causing rotation of the shaft 94 which through the gears 96 and 98 causes rotation of the shaft 100. The mutilated gear 102 on the latter shaft causes the smaller gear 104 to make one rotation and then stop while the gear 102 still continues to rotate. Since the gear 104 is on shaft 26 to which the sprocket wheels are secured, the conveyor is driven during the time the gear 104 is rotating and is then stopped. The rotation of the shaft 94 also causes rotation of the shaft 146, by means of the gears 184 and 186 and rotation of the shaft 146 causes rotation of the cams 144 and 156, these cams being so constructed that the depending fingers 118 and 120 and the wings 168 and 182 are caused to act upon the mouth of a sack while the latter is at rest in a predetermined position, it being understood that the wings are caused to engage opposite sides of the flattened and elongated sack mouth before the fingers have been entirely withdrawn. When the gear 104 is rotating, the projection 230 carried by the member 106 associated with this gear strikes the arm 228, thereby moving the latch 224 into unlatching position and allowing the clutch member 214 to engage the clutch member 210. This causes the gear 208 to rotate the gear 212 and the cam member 115 thereby not only starting the operation of the tying operation in the manner disclosed in Patent No. 1,196,459 dated Aug. 29, 1916, but causes the cam flange 114 on this cam member to engage the roller 116 on the lever 70 and depresses the latter, thereby removing the clutch member 76 from engagement with the clutch member 84 at the same time the latch 66 engages the end of the lever 70 and holds this lever depressed until the latter is released by placing another sack upon the plate 54. It should be observed that in case a sack is placed upon the plate 54 before the cycle of operations being performed upon the preceding sack is completed, the cam flange 114 will still be in engagement with the roller 116 and prevent movement of the clutch member 76 into clutching position When the cam member has been rotated into its original position and the tying operation is completed, the lug 278 on the gear 212 causes the clutch member 214 to be disengaged from the clutch member 210, thereby stopping rotation of the cam member with the arm 222 engaged by the latch member 224 ready for release in the manner previously described. When the spring bolt 110 is retracted and the flange member 112 turned ahead to accommodate the movement of the conveyor to smaller sized sacks, the projection 230 is at the same time advanced, and since the action of this projection upon the arm 228 starts the rotation of the cam member 115, the tying of smaller sized sacks is thereby speeded up. It is to be noted that these two adjustments are effected by turning the single member 112. Adjustment of the amount of separation of the fingers 118 and 120 for different sized sacks is made by changing the position of the spring bolt 200. By referring to Fig. 1, it will be seen that a sack after being placed upon the plate 54 is first moved to intermediate position and stopped while the sack mouth is being flattened and elongated, and that this sack is then moved into position under the tying mechanism and stopped for the tying operation. After this operation is completed, the sack is carried off the delivery end of the platform 44 by the movement of one of the arms 38, these arms at this position being caused to descend vertically in order that the sack may not be forcibly thrown off the platform.

It will also be noted that simultaneously with the moving of a sack from the preliminary preparing position to the tying position, another sack that has been placed upon the plate 54 will be carried to the preparing position, and that while one sack is being tied, the mouth of another sack is being elongated preparatory to being fed between the crimping rollers on its way to the tying position. Immediately the rearward edge of the flattened mouth has passed the crimping rollers 236 and 238 the compacting bar 248 is moved in position by the cam 115, which has meanwhile been put in operation to compress the crimped mouth of the sack into a compacted neck for the reception of the tying cord. It will also be understood that the rearward edge of a narrow sack will pass the crimping rollers in less time than a wider sack will pass that point from the preliminary preparing position and that therefore by advancing the starting point of the compacting and tying cam 115 accordingly for narrower sacks, the tying speed per minute of sacks will be correspondingly increased. It has also been found that for very small sacks at high tying speed of sacks per minute, difficulty is met in keeping the sacks in a proper upright position and stopping them at a spot exactly central to the elongating fingers 118 and 120. The high vertical, rigidly outstanding carrying arms 38 keep these small sacks in a vertical position on the conveyor platform 44 aided by the guide rails 264 and 266, and the flexible strips 274 and 276 prevent overthrow of the sacks at high speeds. It is evident that various details of construction may be modified without departing from the scope of the invention, and we do not, therefore, limit the claims strictly to the construction shown and described.

We claim:

1. A machine for operating upon sacks comprising a conveyor, means for automatically stopping said conveyor when a sack thereon is in predetermined position, and means for pulling the mouth of the sack from opposite sides when the latter is in said position to cause said sack mouth to be flattened and elongated in the direction of travel of the sack.

2. A machine for operating upon sacks comprising a conveyor, means for automatically stopping said conveyor when a sack thereon is in a predetermined position, a pair of cooperating fingers, means for lowering said fingers into the mouth of the sack when the latter is in said position, and means for separating said fingers when in lowered position.

3. A machine for operating upon sacks comprising a conveyor, means for automatically stopping said conveyor when a sack thereon is in predetermined position, a pair of cooperating fingers, means for lowering said fingers into the mouth of the sack when the latter is in said position, means for adjusting the operation of said conveyor for different sized sacks to cause it to stop with the center of the sack directly underneath said fingers, and means for separating said fingers when in lowered position.

4. A machine for operating upon sacks comprising a conveyor, means for automatically stopping said conveyor when a sack thereon is in predetermined position, a pair of cooperating fingers, means for lowering said fingers into the mouth of the sack when the latter is in said position, means for adjusting the operation of said conveyor for different sized sacks to cause it to stop with the sack directly underneath said fingers, means for separating said fingers when in lowered position, and means for adjusting the amount of separation of said fingers according to the size of the sack.

5. A machine for operating upon sacks comprising a conveyor, a yieldingly supported member at the receiving end of said conveyor, connections with said member for starting said conveyor by the weight of a sack placed on said member, means for automatically stopping said conveyor when the sack thereon is in a predetermined position, a pair of cooperating fingers, means for lowering said fingers into the mouth of the sack when the latter is in said position, and means for separating said fingers when in lowered position.

6. A machine for operating upon sacks comprising a pair of cooperating fingers, means for lowering said fingers into the mouth of a sack placed underneath, means for separating said fingers when in lowered position to cause said sack mouth to be flattened and elongated, a pair of wing members, means for bringing said wing members from opposite sides into engagement with said elongated sack mouth, and means for then removing said fingers from said sack mouth.

7. A machine for operating upon sacks comprising a conveyor, means for automatically stopping said conveyor when a sack thereon is in a predetermined position, a pair of cooperating fingers, means for lowering said fingers into the mouth of the sack when the latter is in said position, means for separating said fingers when in lowered position to cause said sack mouth to be flattened and elongated in the direction of travel of the sack, a pair of wing members, means for bringing said wing members from opposite sides into engagement with said elongated sack mouth, means for then removing said fingers from said sack mouth, and a pair of fixed guides between which said elongated sack mouth passes when said conveyor is again started.

8. A machine for operating upon sacks comprising a conveyor, a yieldingly supported member at the receiving end of said conveyor, connections with said member for starting said conveyor by the weight of a sack placed on said member, means for automatically stopping said conveyor when the sack thereon is in a predetermined position, a pair of cooperating fingers, means for lowering said fingers into the mouth of the sack when the latter is in said position, means for separating said fingers when in lowered position to cause said sack mouth to be flattened and elongated in the direction of travel of the sack, a pair of wing members, means for bringing said wing members from opposite sides into engagement with said elongated sack mouth, means for then removing said fingers from said sack mouth, a pair of fixed guides between which said elongated sack mouth passes when said conveyor is again started, a pair of crimping rollers beyond said fixed guides and between which said elongated sack mouth passes, a compacting mechanism beyond said crimping rollers for acting upon the crimped sack mouth, and a tying mechanism for tying the compacted sack mouth.

9. A machine for operating upon sacks comprising an endless conveyor having a plurality of arms attached thereto at regular intervals, means for holding said arms upright on the upper stretch of said conveyor, tying mechanism above the delivery end of said conveyor, and means for causing said arms to descend in vertical position while passing from the upper to the lower stretch at said delivery point.

10. A mechanism for operating upon sacks comprising a conveyor, means for automatically stopping said conveyor when a sack thereon is in a predetermined position, a pair of cooperating fingers, means for lowering said fingers into the mouth of the sack when the latter is in said position, means for adjusting the operation of said conveyor for different sized sacks to cause it to stop with the sack directly underneath said fingers, means for separating said fingers when in lowered position, means for adjusting the amount of separation of said fingers according to the size of the sack, and tying mechanism above the delivery end of said conveyor and underneath which a sack preceding said aforementioned sack is stopped, and means for varying the time of operation of said tying mechanism according to the size of the sack.

11. A machine for operating upon sacks comprising a conveyor, means for automatically stopping said conveyor when a sack thereon is in predetermined position, means for pulling the mouth of the sack from opposite sides when the latter is in said position to cause said sack mouth to be flattened and elongated in the direction of travel of the sack, and means for adjusting the operation of said conveyor for different sized sacks to cause it to stop with the center of the sack directly underneath said pulling means.

12. A machine for operating upon sacks comprising a conveyor, means for automatically stopping said conveyor when a sack thereon is in predetermined position, means for pulling the mouth of the sack from opposite sides when the latter is in said position to cause said sack mouth to be flattened and elongated in the direction of travel of the sack, a pair of wing members, and means for bringing said wing members from opposite sides into engagement with said elongated sack mouth.

13. A machine for operating upon sacks comprising a conveyor, means for automatically stopping said conveyor when a sack thereon is in predetermined position, means for pulling the mouth of the sack from opposite sides when the latter is in said position to cause said sack mouth to be flattened and elongated in the direction of travel of the sack, a pair of wing members, means for bringing said wing members from opposite sides into engagement with said elongated sack mouth, and a pair of fixed guides between which said elongated sack mouth passes when said conveyor is again started.

14. A machine for operating upon sacks comprising a conveyor, a yieldingly supported member at the receiving end of said conveyor, connections with said member for starting said conveyor by the weight of a sack placed on said member, means for automatically stopping said conveyor when the sack thereon is in predetermined position, and means for pulling the mouth of the sack from opposite sides when the latter is in said position to cause said sack mouth to be flattened and elongated in the direction of travel of the sack.

15. A machine for operating upon sacks comprising a conveyor, means for automatically stopping said conveyor when a sack thereon is in predetermined position, means for pulling the mouth of the sack from opposite sides when the latter is in said position to cause said sack mouth to be flattened and elongated in the direction of travel of the sack, means for adjusting the operation of said conveyor for different sized sacks to cause it to stop with the center of the sack directly underneath said pulling means, sack-securing mechanism above the delivery end of said conveyor and underneath which a sack preceding said aforementioned sack is stopped, and means for varying the time of operation of said securing mechanism according to the size of the sack.

In testimony whereof we hereunto affix our signatures.

HENRY O'B. HARDING.
JAMES JESSEN.